(No Model.) 3 Sheets—Sheet 2.
O. F. HEATH.
CLOTH MEASURING MACHINE.
No. 444,354. Patented Jan. 6, 1891.
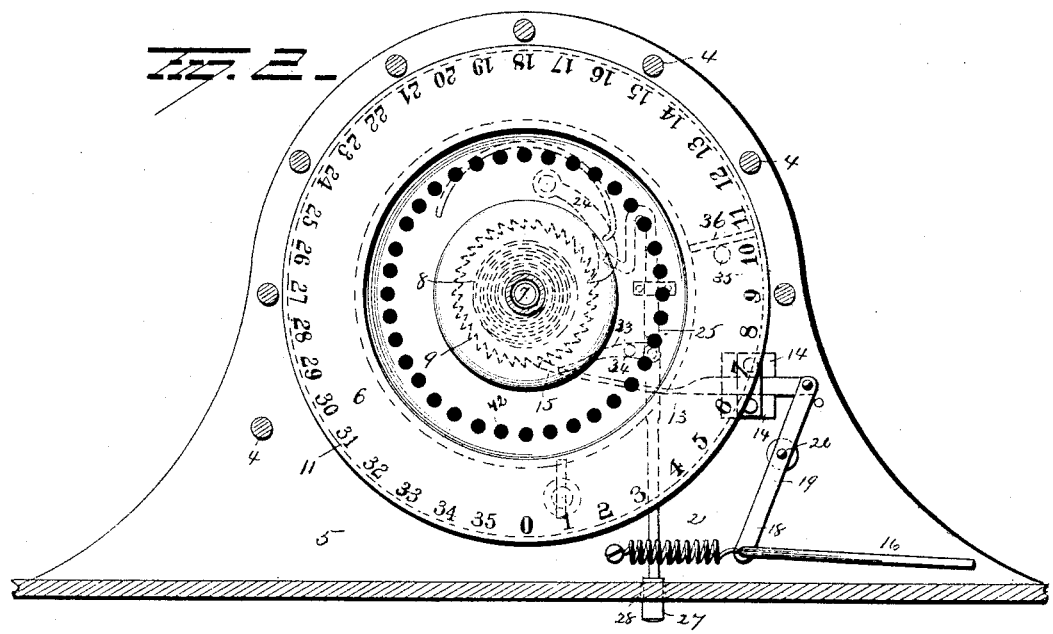
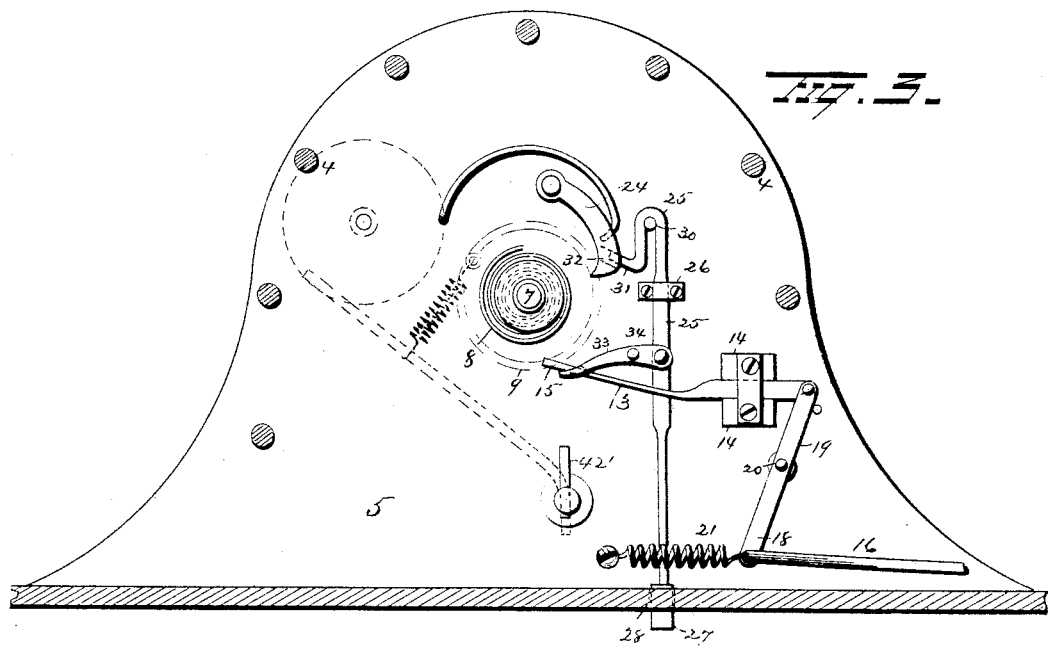
Witnesses
Inventor
O. F. Heath
By his Attorney
H. A. Seymour (No Model.)
O. F. HEATH.
CLOTH MEASURING MACHINE.
No. 444,354. Patented Jan. 6, 1891.
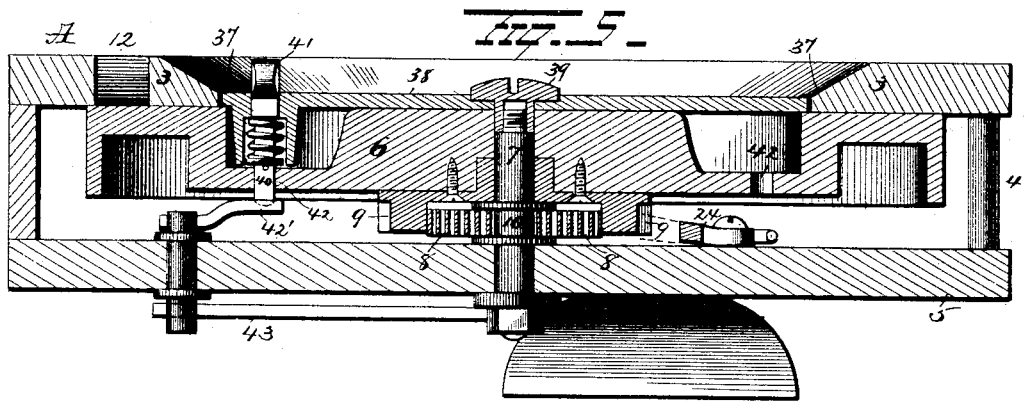
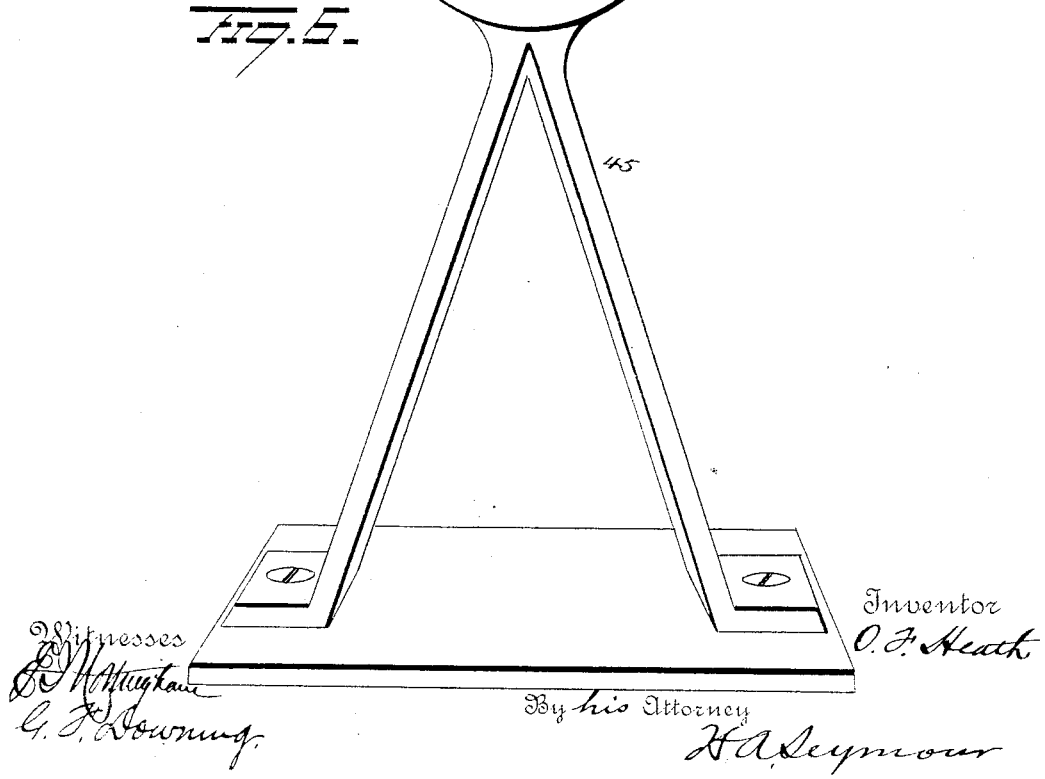

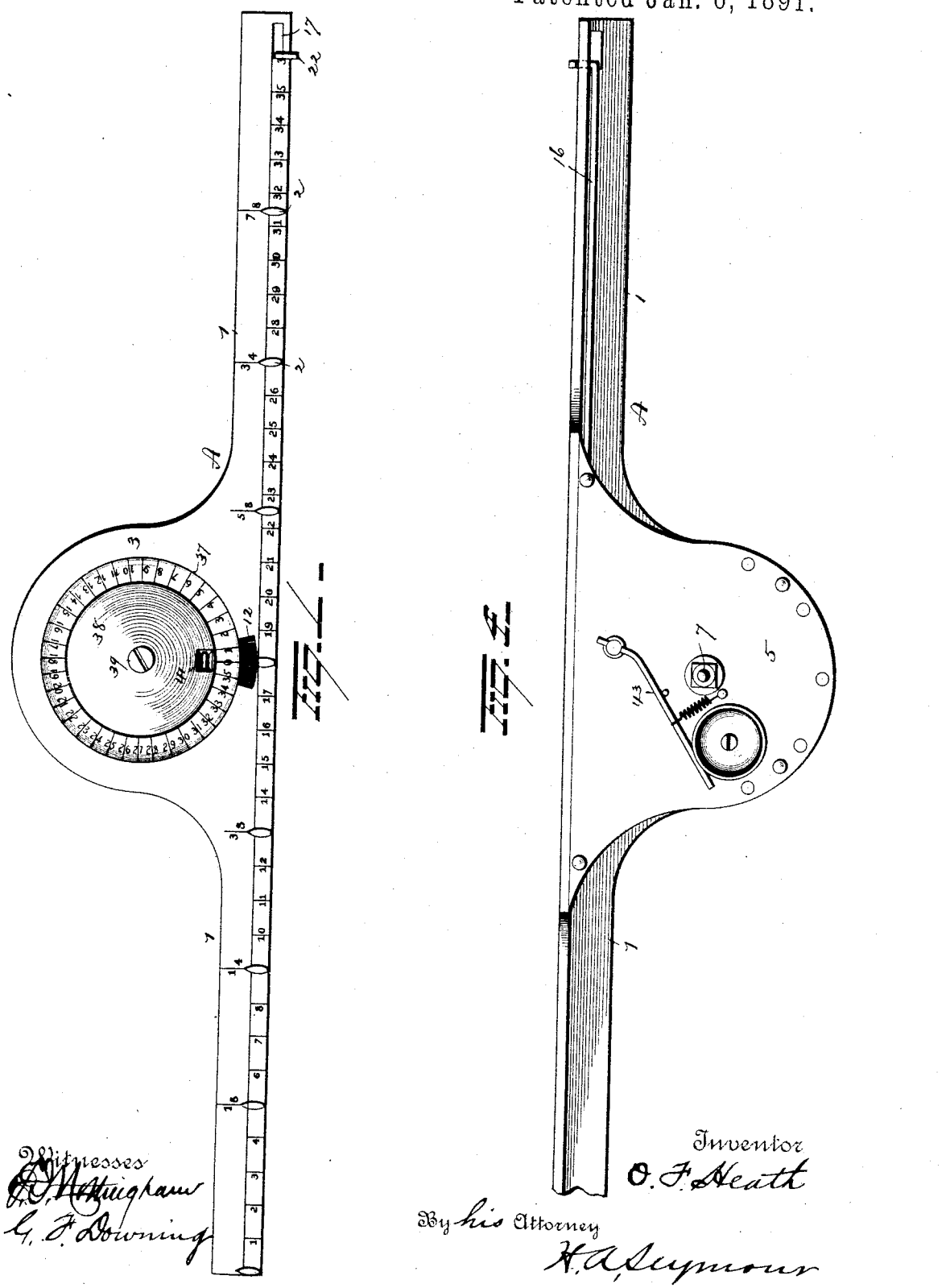

UNITED STATES PATENT OFFICE.

ORLANDO F. HEATH, OF NORTHVILLE, NEW YORK.

CLOTH-MEASURING MACHINE.

SPECIFICATION forming part of Letters Patent No. 444,354, dated January 6, 1891.

Application filed February 15, 1890. Serial No. 340,538. (No model.)

*To all whom it may concern:*

Be it known that I, ORLANDO F. HEATH, of Northville, in the county of Fulton and State of New York, have invented certain new and useful Improvements in Measuring-Instruments; and I do hereby declare the following to be a full, clear, and exact description of the invention, such as will enable others skilled in the art to which it appertains to make and use the same.

My invention relates to an improvement in measuring-instruments, and more especially to that class of instruments employed to measure dry goods and the like, the object being to insure accuracy of measurement and avoid the necessity of counting each yard; and to this end my invention consists of a measure and means for registering the material as fast as it is measured, in combination with an alarm bell or other device for indicating when the required number of yards or units of measure have been measured, so that the operator has only to set the register and measure the goods without having to count the number of yards measured.

It further consists in certain novel features of construction and combinations of parts, as will be hereinafter described, and pointed out in the claims.

In the accompanying drawings, Figure 1 is a plan view showing my invention set in a counter. Fig. 2 is a similar view with the face-plate and dial removed. Fig. 3 is still another view with the registering-wheel also removed to show the operating mechanism. Fig. 4 is a bottom plan view. Fig. 5 is a vertical transverse section, and Fig. 6 is a modification.

A represents a face-plate, which is preferably set in the counter flush with its top. The long and narrow portion 1 of this face-plate represents the yardstick and has the inches indicated thereon, as well as the yard and fractions of a yard, such as eighths, quarters, and halves, at which points, for convenience in measuring, buttons or projections 2 2 are placed. At the middle of this face-plate the rounded enlargement 3 is formed, and back of it and held away a suitable distance by spacing-posts 4 4 the back plate 5, of corresponding shape to the enlargement, is secured. In the space between the plates 3 and 5, and within the spacing-posts, the registering-wheel 6 is revolubly mounted on a central arbor 7, where it is held under tension by the spring 8 for the purpose of returning the wheel to the starting-point when released after an operation of registering has been performed. A ratchet-toothed wheel 9 is mounted on the hub of the registering-wheel, and this wheel is milled out at the center to incase this spring, which is wound on a drum 10, secured to the arbor. Numerals 11 11 on the registering-wheel, from zero upward, correspond in number with the teeth on the wheel 9, so that as each notch on the wheel is engaged and passed a new number of the registering-wheel is exhibited through the sight-hole 12 on the face-plate. For instance, if five yards are measured off, the wheel turns the distance of as many notches, and the numeral "5" appears through the sight-hole. Now this is performed by the following mechanism: A slide-pawl 13 of spring metal is arranged to slide between guide-plates 14 14, secured on the inside of the back plate, and the inner or free end 15 of this pawl extends out tangentially from the teeth of the wheel 9, so that as it is slid inward this end abuts against one of the teeth and turns the wheel. This movement is derived from the rod 16, which extends along back of the yardstick from the outer end or at the thirty-six-inch mark, where it extends loosely through the elongated slot 17 to one end 18 of the lever 19, which is fulcrumed at point 20, and connected at its opposite end with the outer end of the sliding pawl. The lower end 18 of this lever is held normally inward by the spiral spring 21, which in the same manner throws the sliding pawl backward and the rod 16 back to its position. The operator thus forces the rod 16 outward the length of slot 17 by pushing the thumb-piece 22 each time he measures a yard. This swings the lever 19, and the latter slides the pawl 13 inward far enough to turn the registering-wheel one notch, as described, so that as many times as a yard is measured this is repeated, it entailing upon the operator simply the moving of the thumb-piece in the slot. It is also necessary to lock the wheel and prevent its recoiling as a result of the action of the spring, and also while a new hold is being taken by the pawl should it be desired to measure another yard. To this end a spring-actuated dog 24 is pivoted in position to normally engage the teeth of the ratchet-wheel, and thus confine its motion to one direction; but in addition to this it also becomes necessary to allow the wheel to resume its position for another register or return the zero-point to the sight-hole after each record is made, and to accomplish this a trip-rod 25 is resorted to. This rod is held loosely by a strap 26, and its lower end terminates in a thumb-piece 27, and extends laterally through a hole 28 made for it. The inner end of this rod 25 is bent into U shape around a pin or lug 30, which limits the outward throw of the trip-rod, and the extreme end terminates in an inclining pintle 31, which has loose connection with the spring-actuated dog 24 by extending loosely into a hole 32, formed in its outer end to receive it. A short bearing-lever 33, fulcrumed at point 34, is pivoted to the trip-rod and pivotally connected at one end with the rod, its outer end bearing on the slide-pawl so as to disengage the latter from the teeth of the ratchet-wheel when the trip-rod is pushed inward, while at the same time the pintle disengages the spring-actuated dog from the teeth and the combined action of the spring-back of the dog and the spring contact of the sliding pawl force the trip-rod to its normal position. After the number of yards desired has been measured, this trip-rod is pushed in and the registering-wheel returns, as hereinbefore mentioned, and to prevent its turning back beyond zero-point, a pin 35 projects from the back into the groove, where it strikes a pin or other device 36 lying across the groove at the required point. The face-plate has a round opening 37, and on the beveled edge of this opening a series of numbers corresponding with those on the registering-wheel is arranged. A dial 38 is held on the arbor by a screw or nut 39, and this dial is adapted to fit the opening 37. This dial is provided with a spring-actuated pin 40, which has a thumb-piece 41 on its outer end, and this pin is adapted to project through one of the holes 42 formed in the registering-wheel and to protrude far enough beyond to strike the trip 42', which connects the bell-hammer 43.

To set the machine for ringing the bell when the required number of yards have been measured off, the dial is swung around, so that the pin 40 is opposite the number on the bevel edge of the opening 37, which corresponds to the amount to be sold, and the thumb-piece is turned to allow the spring connected with the pin to force the latter in as far as possible. Now when the required number is reached the end of the pin strikes the trip 42', which forces the bell-hammer back, and a small spiral spring returns it sharply against the bell as soon as the trip releases it.

In the modification the device is mounted on a support 45, which takes the place of the counter in places where counters are not used, such as carpet-stores, &c. In this one the yard-scale is arranged on the top, as what in the other form would have been the side.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination, with a case having a measuring-scale thereon and a spring-actuated registering-wheel revolubly supported in the case, of a spring-actuated slide-rod to be slid with each measurement, a spring-actuated slide-pawl connected with the slide-rod and adapted to operate the wheel, locking mechanism, and trip mechanism for releasing said locking mechanism and the pawl from engagement with the registering-wheel, substantially as set forth.

2. The combination, with a face-plate having a measuring-scale and an enlargement at its center, a back held apart from the enlargement a suitable distance, a registering-wheel revolubly supported between the face and back plate, and a ratchet-toothed wheel on the inner hub of this wheel, of actuating and locking mechanism located in proximity to this toothed wheel and means connected therewith for operating and removing the operating and locking mechanism from the wheel simultaneously, substantially as set forth.

3. The combination, with a face-plate having a measuring-scale and a suitable enlargement, a back plate, and a spring-actuated registering-wheel revolubly supported between the face and back plate, said wheel having a ratchet-toothed wheel on its inner hub, of a spring actuated sliding pawl adapted to engage the teeth of the ratchet-wheel, a rod for sliding the pawl to turn the wheel with each measurement, a locking-dog to engage the teeth of the ratchet-wheel, and a trip-bar connected with the pawl and dog for simultaneously operating them both, substantially as set forth.

4. The combination, with a face-plate having a measuring-scale and an enlargement at or near the middle, a back plate held at a suitable distance back of the enlargement to form a suitable space, and a registering-wheel revolubly supported on an arbor in this space between the face and back plates, said wheel having a ratchet-toothed wheel on its inner hub, of a sliding pawl, a spring-actuated lever connected therewith, a rod connected with this lever and extending out to the end of the scale, where it may be slid with each measurement, a spring-actuated locking-dog, and a trip-bar connected loosely with the pawl and dog for operating them simultaneously, substantially as set forth.

5. The combination, with a face and rear plate, of a registering-wheel revolubly supported between said plates, mechanism for operating the wheel, a dial mounted loosely on the arbor which supports the registering-wheel and a pin in the dial for engaging it with the registering-wheel at the required point, and alarm mechanism adapted to be operated by this pin, substantially as set forth.

6. The combination, with a face plate having a measuring-scale, a back-plate, a spring-actuated registering-wheel revolubly supported between said plates, and mechanism for turning the wheel to indicate the number of measurements and resetting the wheel, of a dial, a spring-actuated pin for setting the registering-wheel, a bell, a hammer, and a trip device adapted to be struck by the pin when the predetermined number of measurements has been made, substantially as set forth.

In testimony whereof I have signed this specification in the presence of two subscribing witnesses.

ORLANDO F. HEATH.

Witnesses:
WILLIAM H. VAN DYKE,
BRAYTON A. ARNOLD.